(12) United States Patent
Shin

(10) Patent No.: US 6,738,634 B1
(45) Date of Patent: May 18, 2004

(54) COMMUNICATION SYSTEM AND METHOD FOR PERFORMING SHORT MESSAGE SERVICE IN COMMUNICATION SYSTEM

(75) Inventor: Sang Rim Shin, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/576,052

(22) Filed: May 23, 2000

(30) Foreign Application Priority Data

Jul. 31, 1999 (KR) ..................................... P1999-31610

(51) Int. Cl.[7] .................................................. H04Q 7/20
(52) U.S. Cl. ...................................... 455/466; 370/535
(58) Field of Search ................................ 455/466, 450, 455/451, 452, 464, 516, 517, 515; 370/328, 336, 337, 338, 335, 342–349, 474, 535–540, 542–544, 395.4

(56) References Cited

U.S. PATENT DOCUMENTS

| | | | | |
|---|---|---|---|---|
| 5,878,033 A | * | 3/1999 | Mouly | 370/312 |
| 6,144,653 A | * | 11/2000 | Persson et al. | 370/337 |
| 6,219,557 B1 | * | 4/2001 | Havinis | 455/456 |
| 6,263,212 B1 | * | 7/2001 | Ross et al. | 455/466 |
| 6,385,451 B1 | * | 5/2002 | Kalliokulju et al. | 455/437 |
| 6,434,133 B1 | * | 8/2002 | Hamalainen | 370/338 |
| 6,473,622 B1 | * | 10/2002 | Meuronen | 455/466 |

* cited by examiner

Primary Examiner—Jean Gelin
(74) Attorney, Agent, or Firm—Fleshner & Kim, LLP

(57) ABSTRACT

A communication system and a method for performing short message services in the communication system are disclosed. The communication system includes: a radio link control (RLC) layer for dividing a data unit having a first length corresponding to short messages transmitted from a higher layer on a down link into data units having second lengths, and for reconstructing data units having third lengths transmitted from a lower layer on an up link into data units having fourth lengths; and a media access control (MAC) layer for multiplexing logical channels assigned for the data units having the second lengths on the down link with different logical channels, performing scheduling for the data units having the second lengths to obtain schedule messages, and demultiplexing transmission channels multiplexed from the lower layer on the up link.

22 Claims, 8 Drawing Sheets

UE MAC-c entity

Fig.3

PRIOR ART

| Type(=00) | start slot number | 1 octet |
| Spare | End Slot Number | 2 |
| New SMS CB Message Bitmap | | 3 |
| | | 4 |
| | | 5 |
| | | 6 |
| | | 7 |
| | | 8 |
| New SMS CB Message Description | | 9 |
| | | 10 |
| Other Message Descrptions | | 11 |
| | | 12 |
| | | 13 |

88 octets

Fig.4

| Serial Number | 1 octet |
| --- | --- |
| | 2 |
| Message identifier | 3 |
| | 4 |
| Data Coding Scheme | 5 |
| Page parameter (note1) | 6 |
| Content | 7 |
| | X octets (note1) |

UE MAC-c entity

COMMUNICATION SYSTEM AND METHOD FOR PERFORMING SHORT MESSAGE SERVICE IN COMMUNICATION SYSTEM

BACKGROUND OF THE INVENTION

1. Field of the Invention

The present invention relates to a communication system and a method for performing short message services in the communication system, and more particularly, to a communication system suitable for third generation partnership project (3GPP) and a method for performing short message services (SMS) in the communication system.

2. Discussion of the Related Art

The technology for short message services provided under CDMA environment is based on short message standard IS-637. The short message services in a radio section are based on IS-95 and J-STD-008. For such short message services under the CDMA environment, a service center provides short messages, and a base station receives the short messages from a core network and transmits them to a mobile station through a control channel, i.e., a paging channel. The service center can transmit the short messages together with destination addresses and other service information, and the mobile station (i.e., user equipment) can receive the short messages in an idle state.

Furthermore, a global system for mobile communications (GSM) for multimedia services such as voice and audio data supports cell broadcasting of the short message services under radio environment. To this end, the European telecommunication standard institute (ETSI) suggests technical specification to realize cell broadcasting of the short message services.

The cell broadcasting of the short message services in the GSM broadcasts short messages from a public land mobile network (PLMN) to a user equipment (UE).

A 3GPP system will be described with reference to FIG. 1. The 3GPP system consists of a user equipment (UE) system, a network (or UTRAN) system, and a core system, and as shown in FIG. 1, each systems have bidirectional channels. (particularly, between the UE and the UTRAN.) In other words, the 3GPP system has an up link and a down link. Each system includes a higher layer, a radio resource control (RRC) layer corresponding to the lowest layer (layer 3), a radio link control (RLC) layer and a media access control (MAC) layer corresponding to layer 2, and a physical layer corresponding to layer 1. The physical layer provides different transmission channels to the MAC layer. The MAC layer provides different logical channels to the RLC layer. The transmission channels provided to the MAC by the physical layer are classified into common channels and dedicated channels according to information transmission mode on a radio line. The transmission channels have different characteristics depending on how information is transmitted on a radio line.

The logical channels provided to the RLC layer by the MAC layer have different characteristics according to transmitted information types. The MAC layer provides data transmission services (control data transmission or user data transmission) through the respective logical channels having different characteristics. Accordingly, the respective logical channels are divided into control channels and traffic channels depending on which information (for example, control data or general data) is transmitted.

The higher layer transmits a corresponding message to the RLC layer corresponding to a lower layer depending on service type selected by a user. The RRC layer controls logical connection of the lower layers (RLC layer, MAC layer and PHY layer) which provide services selected at the higher layer. To this end, the RRC layer is connected with the respective lower layers by a service access point (SAP) for control. The RRC layer is controlled by receiving and transmitting primitives through the SAP. Also, the RRC layer serves to confirm, maintain and release the connection, and serves to assign, reconstruct and release radio resources for the connection.

The RLC layer which received service messages from the higher layer controls radio link connection with a corresponding system. The RLC layer also serves to divide and reconstruct the received messages and compress header (RLC header), and serves to perform concatenation, padding, error correction, flow control and transmission of capsulated data units.

The MAC layer receives the capsulated data units from the RLC layer and analyzes their header to make MAC data units. The MAC data has radio characteristics suitable for radio interface and uses corresponding transmission channels depending on how data is transmitted.

The physical layer provides functions such as encoding and decoding of the transmission channels, multiplexing and demultiplexing of the transmission channels, modulation and spread of physical channels, demodulation and despread of physical channels, synchronization of chip, bit, slot and frame, power control, frequency processing, error detection, and transmission speed control.

Particularly, two messages for cell broadcasting of the short message services (SMS) are defined in the GSM. The two messages are SMS cell broadcasting (SMSCB) message and a schedule message.

FIG. 2 is a diagram showing a scheme of SMSCB message defined in the GSM. FIG. 3 is a diagram showing a scheme of a schedule message defined in the GSM.

In FIG. 2, the SMSCB message is of 88 octet unit, and each field is of octet unit.

There are provided a serial number field, a message identifier field, a data coding scheme field, and a page parameter field in the SMSCB message.

Also, the schedule message is of octet unit, and includes four successive blocks, as shown in FIG. 3.

The cell broadcasting of the SMS in the GSM includes a discontinuous reception (DRX) mode and a non-discontinuous reception (Non-DRX) mode.

In the DRX mode, the user equipment reads the SMSCB message using the schedule message only when a desired SMSCB message is newly renewed, and does not receive any message data for the other time.

On the other hand, in the Non-DRX mode, the user equipment can read messages of all frames. At this time, all the SMSCB messages can be read in even case that there is no separate information by the schedule message. The user equipment analyzes header of the SMSCB message and reads a corresponding available SMSCB message.

The aforementioned SMSCB message and the schedule message are adapted to radio environment in the GSM but are not adapted to next generation mobile communication. In other words, macro message transmission is expected in the next generation but each message in the GSM does not exceed 88 octet. Also, the SMSCB message does not exceed 15 pages and header should be accompanied for each SMSCB message corresponding to each page.

In order to apply the short message service provided under the CDMA environment or the SMS cell broadcasting provided under the GSM environment to the next generation mobile communication system which seeks global roaming service, much correction is required.

Particularly, the technical specification for the SMS cell broadcasting is required to be suitable for the 3GPP system which is the next generation mobile communication system based on the core network of the GSM and the radio access technology.

SUMMARY OF THE INVENTION

Accordingly, the present invention is directed to a communication system and a method for performing short message services in the communication system, that substantially obviate one or more of the problems due to limitations and disadvantages of the related art.

An object of the present invention is to provide a communication system suitable for a third generation partnership project (3GPP) radio environment and a method for performing short message services in the communication system.

Another object of the present invention is to provide a communication system capable of making short message without any restriction and a method for performing short message services (SMS) in the communication system.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a communication system according to the present invention includes: a radio link control (RLC) layer for dividing a data unit having a first length corresponding to short messages transmitted from a higher layer on a down link into data units having second lengths, and for reconstructing data units having third lengths transmitted from a lower layer on an up link into data units having fourth lengths; and a media access control (MAC) layer for multiplexing logical channels assigned for the data units having the second lengths on the down link with different logical channels, performing scheduling for the data units having the second lengths to obtain schedule messages, and demultiplexing transmission channels multiplexed from the lower layer on the up link.

In another aspect, a method for performing short message services (SMS) between a first communication system and a second communication system includes the steps of: (a) dividing a short message having a first length from a higher layer of the first communication system into data units having second lengths on a radio link control (RLC) layer of the first communication system; (b) multiplexing transmission channels for the divided data units with different channels at a MAC layer of the first communication system corresponding to a lower layer than the RLC layer, and performing scheduling on the multiplexed channels to obtain schedule messages; (c) transmitting the schedule messages and the data units to a second communication system through transmission channels corresponding to a radio interface section; and (d) selectively receiving the transmitted short messages from the MAC layer of the second communication system using information included in the transmitted schedule messages.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIG. 3 is a diagram illustrating schedule messages defined in a GSM;

FIG. 4 is a diagram illustrating the scheme of short messages for short message services according to the present invention;

DETAILED DESCRIPTION OF THE PREFERRED EMBODIMENTS

Reference will now be made in detail to the preferred embodiments of the present invention, examples of which are illustrated in the accompanying drawings.

A method for performing short messages (or SMS cell broadcasting method) according to the present invention will be described with reference to the accompanying drawings.

A 3GPP system includes different technical specification groups for each technical area. Of the specification groups, the first working group WG1 related to radio access network (RAN) suggests a general technology for a physical layer (Layer 1). The second working group WG2 defines a data link layer (Layer 2) and a network layer (Layer 3) higher than the physical layer as a second radio layer (Radio Layer 2) and a third radio layer (Radio Layer 3), respectively.

In the present invention, it is characterized in that the SMS technology for the data link layer and the network layer has been improved.

Figure 1:
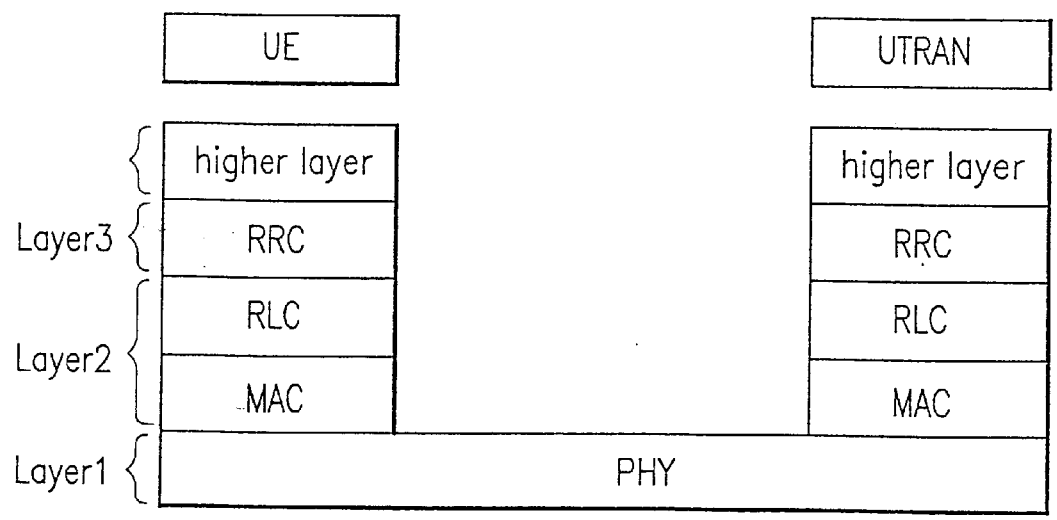
FIG. 1 is a diagram illustrating a general air interface scheme.
Figure 2:
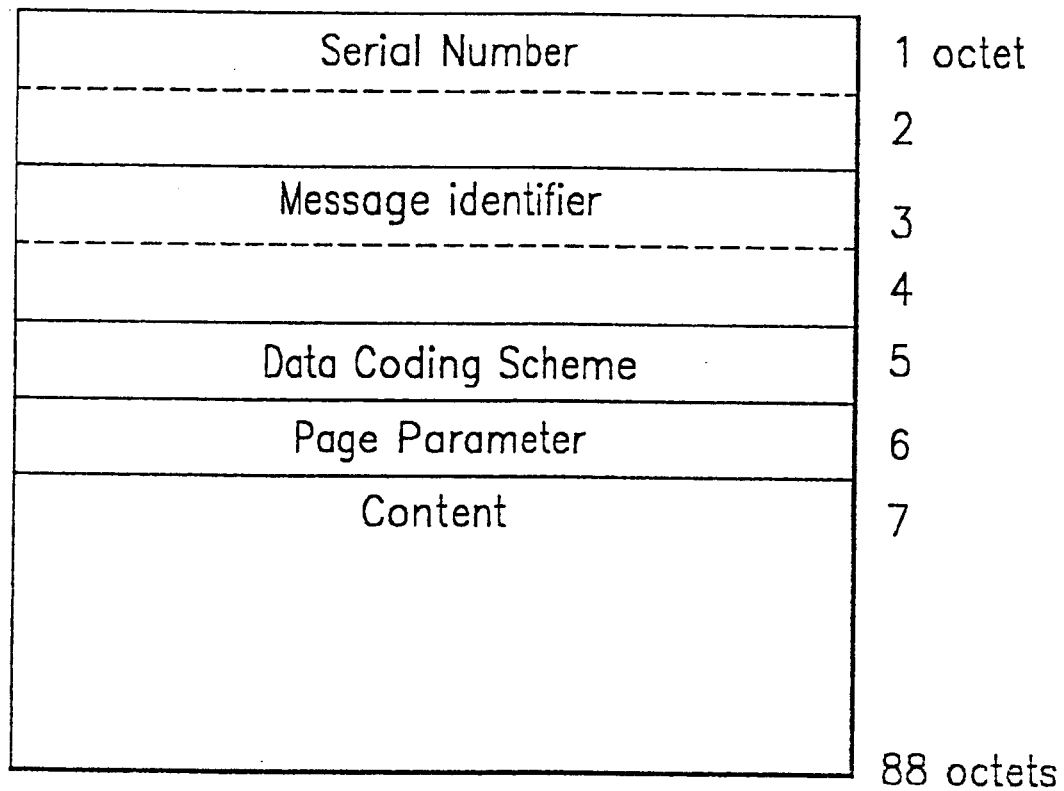
FIG. 2 is a diagram illustrating short messages defined in a GSM.
Figure 5:
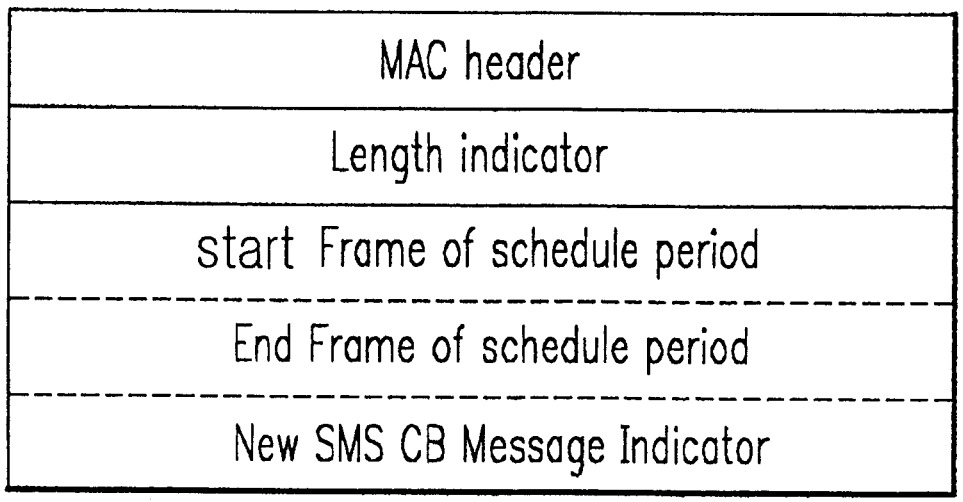
FIG. 5 is a diagram illustrating the scheme of schedule messages for short message services according to the present invention.

In the present invention, SMSCB messages and schedule messages are used but types for the respective messages are different. FIG. 4 is a diagram showing the scheme of the SMSCB messages and FIG. 5 is a diagram showing the scheme of the schedule messages.

As shown in FIG. 4, there are provided a serial number field, a message identifier field, a data coding scheme field, and a page parameter field in the SMSCB messages.

The message identifier field indicates a type and a source of the SMSCB message. That is, the message identifier field indicates whether the SMSCB message belongs to weather information, stock information, traffic information, or the like.

The SMSCB message according to the present invention is repeatable and renewable. Also, the message of the present invention is selectable and is not limited to 88 octet. Therefore, it is not necessary to limit the number of whole pages in the page parameter field and the number of pages containing contents. It is not necessary to limit the length of the SMSCB message.

In the present invention, the SMSCB message transmitted from an application layer (higher layer) is segmented from a radio link control (RLC) layer of the second radio layer (Layer 2). A media access control (MAC) layer lower than the RLC layer performs scheduling, and attaches a header indicative of the length of the schedule message to the schedule message.

On the other hand, in the related art GSM mode, the RLC layer performs scheduling of the SMSCB message and attaches a header indicative of the length of the schedule message. The SMSCB message segmentation is also performed in the RLC layer.

Furthermore, in the present invention, the MAC layer produces and decodes the schedule messages. The schedule message is the MAC message and is adapted to protocol data unit (PDU) corresponding to the MAC control protocol.

The schedule message of the present invention is not scheduled at a specific period but schedules the SMSCB message. Accordingly, since the current schedule message contains location information for a next schedule message, the quipment is able to know the location of the next schedule message in advance.

Referring to FIG. 5, the schedule message includes a MAC header, a length indicator field, a field indicating start and end of the schedule period for the SMSCB message, and a field indicating the presence of a new SMSCB message.

Figure 6:
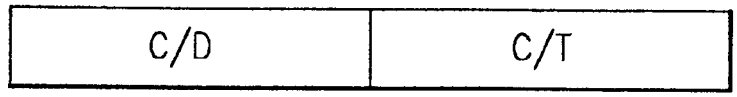
FIG. 6 is a diagram illustrating the scheme of a MAC header of the schedule messages according to the present invention.

FIG. 6 is a diagram showing the scheme of the header. As shown in FIG. 6, the MAC header includes a field (C/D) indicating whether the data unit is to be mapped with a common logical channel or a dedicated logical channel. The MAC header further includes a field (C/T) indicating whether the data unit is to be mapped with a common control channel (CCCH) or a common traffic channel (CTCH). If the data unit is to be mapped with the common traffic channel (CTCH), it is shown on the field whether the data unit is the SMSCB message or the schedule message.

The length indicator field indicates the length of the schedule message. The schedule message can be extended to successive frames using the length indicator field.

Each field indicating start and end of the schedule period for the SMSCB message indicates start point and end point of the successive frame periods of the SMSCB.

The field indicating the presence of the new SMSCB message indicates when the SMSCB message has been renewed and which frame includes the renewed message.

The cell broadcasting method for the SMS, i.e., the method for performing the SMS will be described.

As aforementioned, the SMS cell broadcasting in the 3GPP is divided into a DRX mode and a non-DRX mode according to the type of the short messages transmitted from the higher layer.

In the non-DRX mode, the user equipment reads all the frames which are the data units transmitted on the radio line. At this time, the user equipment can exactly read all the SMSCB messages without separate information by the schedule message. During reading the frames, the user equipment reads a header of the SMSCB message so that the user can classify its desired message and undesired message. In the DRX mode, the equipment should know when each SMSCB message is transmitted from the network (UTRAN)

in the cell in order that the user equipment receives the SMSCB message from the network (UTRAN). Therefore, the schedule message is used. The DRX mode is performed as the user equipment reads the schedule message.

In the DRX mode, if the user equipment reads the schedule message, the user equipment can know whether the SMSCB message has been newly renewed through the field indicating the presence of the new SMSCB message. Also, each field indicating start and end of the schedule period for the SMSCB message indicates a frame of successive frames, where the newly renewed message is located.

Accordingly, when the desired SMSCB message of the user equipment is renewed for the schedule period, the user equipment can read messages of the corresponding frame using the schedule message.

Figure 7:
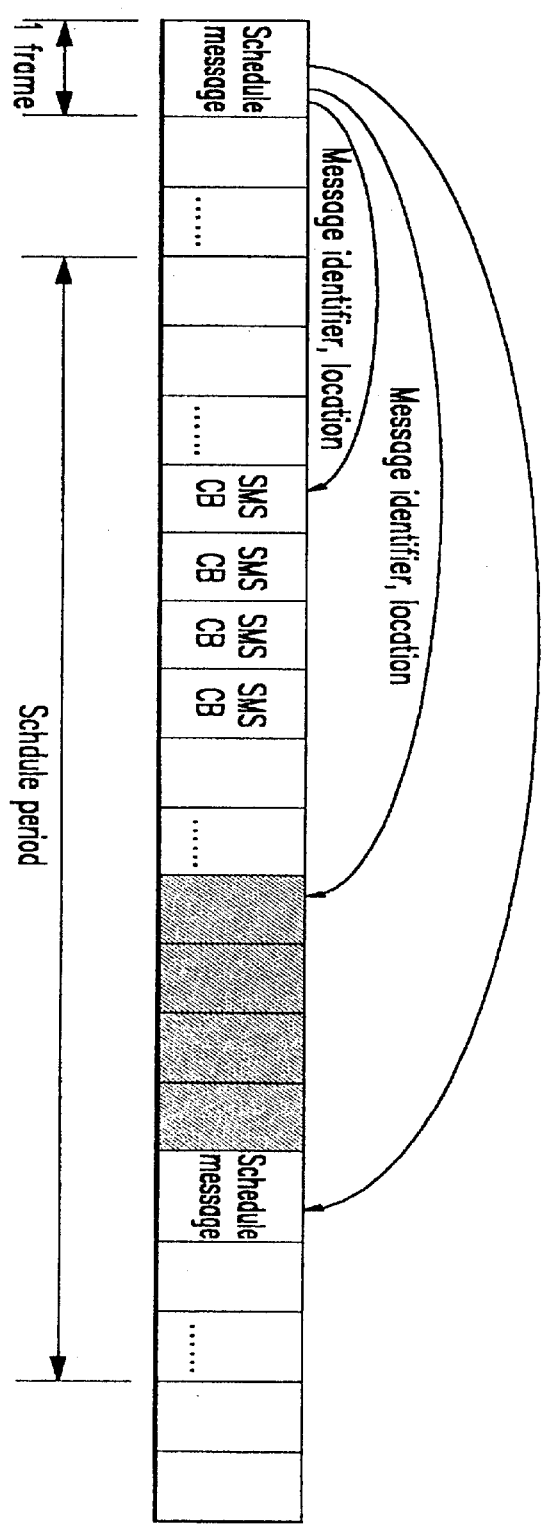
FIG. 7 is a diagram illustrating a transmission scenario of short message services according to the present invention.

FIG. 7 is a diagram showing a transmission scenario for illustrating SMS cell broadcasting method according to the present invention. As is known from FIG. 7, the schedule message has identifier information of the renewed SMSCB message, its location information, and location information of the next schedule message.

The user equipment reads the schedule message and then can selectively read its desired SMSCB message.

Figure 8:
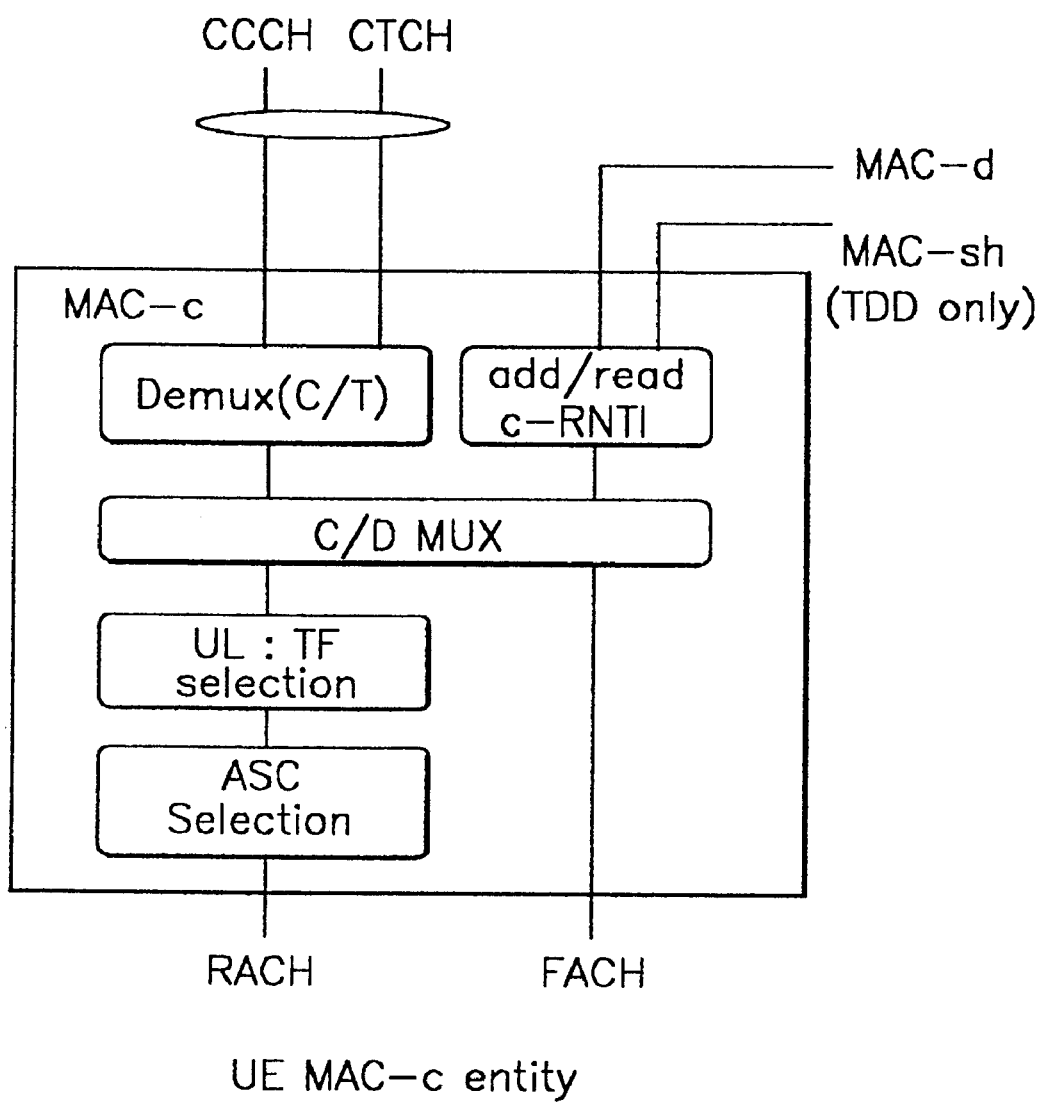
FIG. 8 is a diagram illustrating the scheme of a MAC layer at a user equipment according to the present invention.
Figure 9:
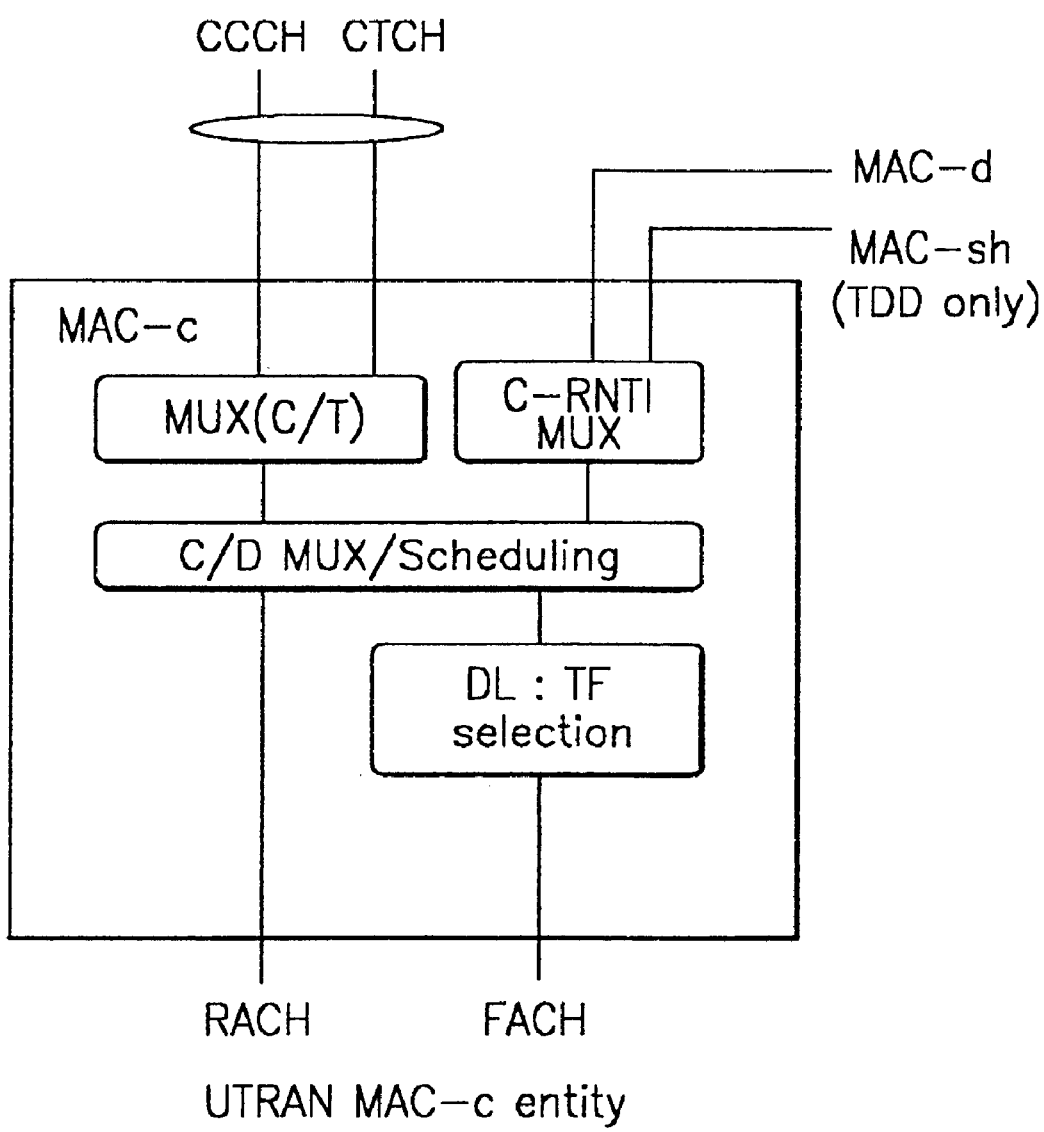
FIG. 9 is a diagram illustrating the scheme of a MAC layer at a network according to the present invention.

FIG. 8 is a diagram illustrating the scheme of a common MAC layer at a user equipment for SMS cell broadcasting according to the present invention, and FIG. 9 is a diagram illustrating the scheme of a common MAC layer at a network for SMS cell broadcasting according to the present invention.

As shown in FIGS. 8 and 9, the SMSCB message transmitted from the higher layer is transmitted to a common traffic channel (CTCH) of common logical channels.

The MAC layer multiplexes the common traffic channel (CTCH) with a common control channel (CCCH) which is another common logical channel, a dedicated traffic channel (DTCH) which is a dedicated logical channel, and a dedicated control channel (DCCH). Then, scheduling for the SMS cell broadcasting is performed.

The MAC layer provides the logical channels to the higher RLC layer, and provides different logical channels according to types of information transmitted from the higher layer. In other words, the MAC layer provides data transmission services through the logical channels. The types of the logical channels are different according to the kinds of the data transmission services provided by the MAC layer. Generally, when control plane information is transmitted, the control channel is provided as a logical channel. When user plane information is transmitted, the traffic channel is provided as a logical channel.

The logical channel is divided into the control channel and the traffic channel.

The control channel includes a dedicated control channel (DCCH) and a common control channel (CCCH). The dedicated control channel (DCCH) which is a bidirectional channel between points for transmitting dedicated control information between the user equipment (UE) and the network (UTRAN). The common control channel (CCCH) is a bidirectional channel for transmitting control information between the user equipment (UE) and the network (UTRAN). The dedicated control channel (DCCH) is established by the radio resource control (RRC) layer which is higher than the MAC layer, and the common control channel (CCCH) is commonly used by a plurality of user equipments (UEs) when the network (UTRAN) does not access the RRC layer.

The traffic channel includes a dedicated traffic channel (DTCH) which is a dedicated channel assigned to the user equipment (UE) on a dedicated line to transmit user information, and a common traffic channel (CTCH) which is a unidirectional channel for transmitting dedicated user information to specific user groups or all the user equipments (UEs). The dedicated traffic channel (DTCH) exists in both a down link and an up link.

If scheduling for the SMS cell broadcasting is performed after multiplexing the logical channels, the MAC layer at the network (UTRAN) can note a frame to where the data transmitted to each logical channel is transmitted.

Therefore, the MAC layer produces the schedule message for transmission of the SMSCB message. The user equipment (UE) can note a frame to where the renewed SMSCB message in the DRX mode is located.

After all, in the present invention, the MAC layer at the network (UTRAN) performs channel multiplexing and scheduling while the MAC layer at the user equipment (UE) performs demultiplexing for the channels.

Afterwards, a forward access channel (FACH) is assigned to the physical layer which is the lower layer, as a transmission channel for transmission of the SMSCB message. The forward access channel (FACH) is a common down link channel used to transmit relatively small data.

In the physical layer, it is important which data is how to be transmitted in a radio section. The user equipment (UE) collects various information for the SMSCB message transmitted through the physical channel to the schedule message which is transmitted from the MAC layer of the network (UTRAN) to its MAC layer. Then, the user equipment (UE) reads its desired SMSCB message.

As aforementioned, the communication system and the method for performing short message services in the communication system have the following advantages.

The scheduling function is performed in the MAC layer at the network (UTRAN), and then the MAC layer at the network (UTRAN) transmits the schedule message to the MAC layer at the user equipment (UE) through a radio channel. Thus, short message services can efficiently be performed as compared with the related art system and method.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A communication system comprising:
   a radio link control (RLC) layer for dividing a data unit having a first length corresponding to short messages transmitted from a higher layer on a down link into data units having second lengths, and for reconstructing data units having third lengths transmitted from a lower layer on an up link into data units having fourth lengths; and
   a media access control (MAC) layer for multiplexing logical channels assigned for the data units having the second lengths on the down link with different logical channels, performing scheduling for the data units having the second lengths to obtain schedule messages, and demultiplexing transmission channels multiplexed from the lower layer on the up link.

2. The communication system as claimed in claim 1, further comprising a physical layer for assigning radio transmission channels required to transmit data between the MAC layer and an opposite MAC layer.

3. The communication system as claimed in claim 1, wherein the MAC layer further includes a MAC header for the multiplexing step, having the size of the schedule messages within the schedule messages on the down link.

4. The communication system as claimed in claim 3, wherein the schedule messages include the MAC header, a length indicator field indicating the length of the schedule messages, a field indicating start point and end point of a schedule period for short messages, and a field indicating the presence of a new SMS cell broadcasting.

5. The communication system as claimed in claim 4, wherein the MAC header includes a field indicating whether the data units are to be mapped with a common logical channel or a dedicated logical channel, and a field indicating whether the data units are to be mapped with a common control channel (CCCH) or a common traffic channel (CTCH).

6. The communication system as claimed in claim 4, wherein the schedule messages extend to successive frames using the length indicator field.

7. The communication system as claimed in claim 5, wherein the MAC header includes information indicating whether the data units are SMSCB or schedule messages if the data units are mapped with the common traffic channel (CTCH).

8. The communication system as claimed in claim 4, wherein the field indicating the presence of the new short message includes information indicating a frame where the new short message is located.

9. A method for performing short message services (SMS) between a first communication system and a second communication system, the method comprising the steps of:
   (a) dividing a short message having a first length from a higher layer of the first communication system into data units having second lengths on a radio link control (RLC) layer of the first communication system;
   (b) multiplexing transmission channels for the divided data units with different channels at a MAC layer of the first communication system corresponding to a lower layer than the RLC layer, and performing scheduling on the multiplexed channels to obtain schedule messages;
   (c) transmitting the schedule messages and the data units to a second communication system through transmission channels corresponding to a radio interface section; and
   (d) selectively receiving the transmitted short messages from the MAC layer of the second communication system using information included in the transmitted schedule messages.

10. The method as claimed in claim 9, wherein the first communication system is one of a user equipment (UE) and a network, and the second communication system is the other.

11. The method as claimed in claim 9, wherein the schedule messages include information for informing the second communication system of location of the next schedule message.

12. The method as claimed in claim 9, wherein the schedule messages include a field indicating start point and end point of a schedule period for the short messages, a field indicating the presence of a renewed short message and location of the renewed short message within the schedule period, a field indicating whether the short messages are to be mapped with a common logical channel or a dedicated logical channel, and a field indicating whether the short messages are to be mapped with a common control channel (CCCH) or a common traffic channel (CTCH).

13. The method as claimed in claim 12, wherein the step (d) includes the steps of reading all data units corresponding to the short messages transmitted through a radio channel without using separate information by the schedule messages at the user equipment (UE), and classifying the user equipment's desired short message and its undesired short message by reading a header of the data units during reading all the data units.

14. The method as claimed in claim 12, wherein the step (d) includes the steps of identifying a corresponding frame of successive frames, where the renewed short message is located through each field indicating the presence of the renewed short message and start and end of the schedule period for the short message by reading the schedule messages, and reading the renewed short message from the corresponding frame using the identified information from the schedule message.

15. The method as claimed in claim 9, wherein in the steps (a) and (b), the short message transmitted from the higher layer is transmitted to the RLC layer through the common traffic channel (CTCH) among the common logical channels, and the common traffic channel (CTCH) is multiplexed with the common control channel (CCCH) which is the other common logical channel, the dedicated traffic channel (DTCH) and the dedicated control channel (DCCH), at the media access control layer, wherein the dedicated traffic channel (DTCH) and the dedicated control channel (DCCH) are dedicated logic channels.

16. The method as claimed in claim 9, wherein the MAC layer provides different logical channels to the RLC layer depending on types of messages transmitted from the higher layer.

17. The method as claimed in claim 16, wherein the logical channel is provided as a control channel when control plane information is transmitted by the MAC layer while the logical channel is provided as a traffic channel when user plane information is transmitted.

18. The method as claimed in claim 17, wherein the control channel includes a dedicated control channel (DCCH) which is a bidirectional channel between points for transmitting dedicated control information between the first communication system and the second communication system, and a common control channel (CCCH) which is a bidirectional channel for transmitting control information between the first communication system and the second communication system.

19. The method as claimed in claim 17, wherein the traffic channel includes a dedicated traffic channel (DTCH) between two points, which is a dedicated channel assigned to the first communication system on a dedicated line to transmit user information, and a common traffic channel (CTCH) which is a unidirectional channel for transmitting dedicated user information to specific user groups or all the user equipments (UEs).

20. The method as claimed in claim 19, wherein the dedicated traffic channel (DTCH) exists in both a down link and an up link.

21. The method as claimed in claim 9, wherein in the step (c), a forward access channel is used as a transmission channel for transmitting data units corresponding to the short messages.

22. The method as claimed in claim 21, wherein the forward access channel is a common down link channel used to transmit relatively small data.

\* \* \* \* \*